United States Patent

[11] 3,572,495

| [72] | Inventor | Pierre Luginbuhl |
| | | Neuhausen am Rheinfall, Switzerland |
| [21] | Appl. No. | 786,893 |
| [22] | Filed | Dec. 26, 1968 |
| [45] | Patented | Mar. 30, 1971 |
| [73] | Assignee | Schweizerische Industrie- Gesellschaft |
| | | Neuhausen am Rheinfall, Switzerland |
| [32] | Priority | Feb. 13, 1968 |
| [33] | | Switzerland |
| [31] | | 2106/68 |

[54] METHOD AND APPARATUS FOR SEPARATING CONTIGUOUS OBJECTS AND FOR MOVING THEM TO A SECOND ADVANCING MEANS
7 Claims, 2 Drawing Figs.

[52] U.S. Cl. .................................................. 198/34, 198/76
[51] Int. Cl. .................................................... B65g 47/26
[50] Field of Search ......................................... 198/34, 76

[56] References Cited
UNITED STATES PATENTS
1,924,146  8/1933  Almgren ..................... 198/34X
FOREIGN PATENTS
216,964  8/1961  Austria ........................ 198/34
385,717  3/1965  Switzerland ................ 198/34

*Primary Examiner*—Evon C. Blunk
*Assistant Examiner*—Douglas D. Watts
*Attorney*—Singer, Stern and Carlberg ABSTRACT: A buffer synchronizes the movement of the foremost chocolate bar of a row of contiguous bars, from a first conveyer, with the movement of a second conveyer. Two pairs of clamping jaws, working alternately, then accelerate the foremost bar to the second conveyer, while another pair of jaws, timed with the operation of the first conveyer and with the two other pairs of jaws, holds the bar behind the foremost one and advances it in synchronism with the first conveyer.

METHOD AND APPARATUS FOR SEPARATING CONTIGUOUS OBJECTS AND FOR MOVING THEM TO A SECOND ADVANCING MEANS

BACKGROUND OF THE INVENTION

The invention relates to a method and to apparatus for separating contiguous, flat objects moved forward in a continuous row by a first advancing means and for further advancing the objects, uniformly spaced, by a second advancing means.

A member of prior-art devices carry out these two functions quite satisfactorily. These devices briefly stop the row of objects on the first conveyor, while the latter continues to move, separate the foremost object from the one behind it, and then by some suitable advancing arrangement move the object to the second conveyor, whereupon the row of objects on the first conveyor is freed, so that the next object is moved to the aforesaid advancing arrangement.

Since the row of objects must be repeatedly accelerated from standstill to the speed of the conveyor, and since this acceleration is accompanied by friction between the conveyor surface and the bottoms of the objects, a certain amount of time is lost, the consequence of which is that the output of these known devices is limited to abut 150 to 200 objects per minute, depending on the size of the objects.

SUMMARY OF THE INVENTION

The purpose of the invention is to produce a method, and an apparatus for carrying out that method, for appreciably increasing the output of these devices, by avoiding the periodic stopping and acceleration of the row of objects.

BRIEF DESCRIPTION OF THE DRAWINGS

The invention will be described, with reference to the FIG. of the drawings, wherein.

DESCRIPTION OF THE PREFERRED EMBODIMENT

Figure 1:
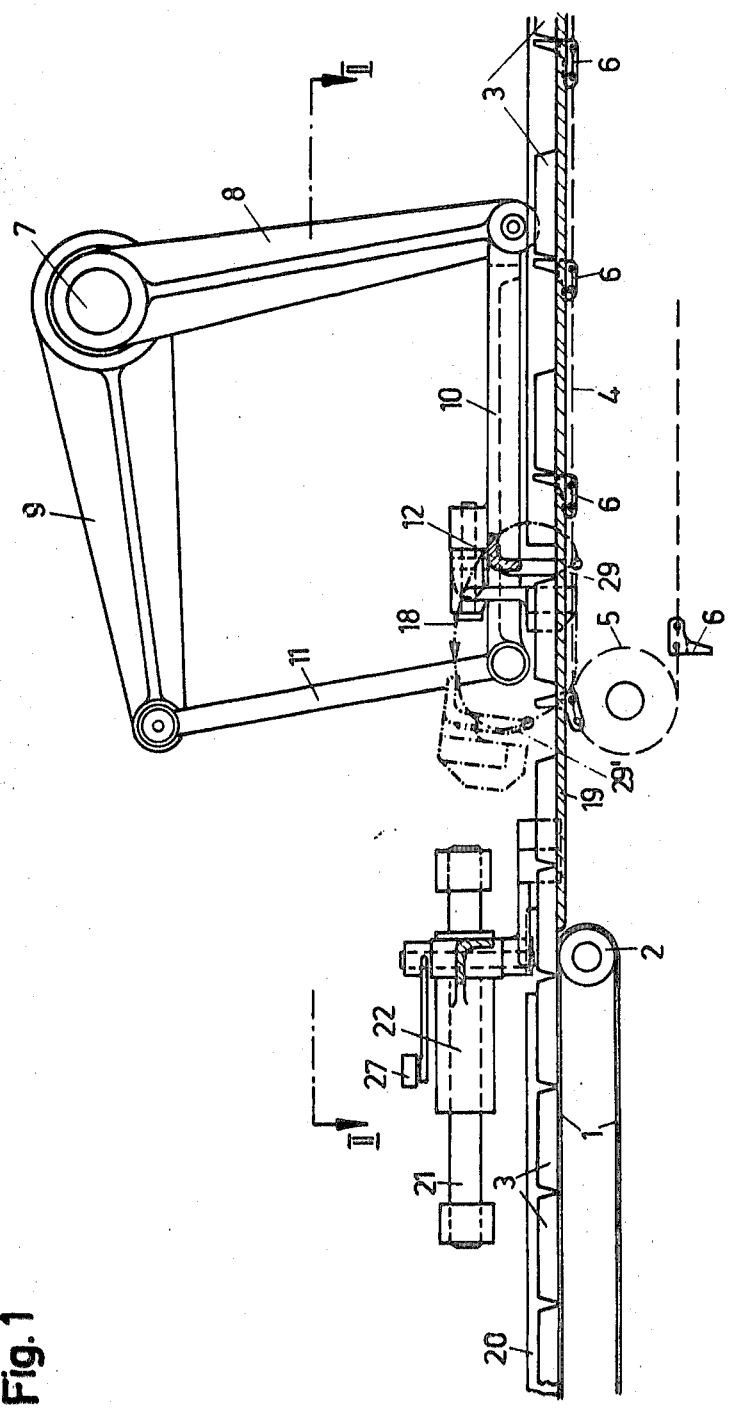
FIG. 1 is a side view, partly in section, of the device of the invention.

A continuous series of contiguous, flat objects 3, such as chocolate bars, is moved by an endless conveyor belt 1, of which only the front end, with its guide roller 2, is shown. These objects must be transferred to a second endless conveyor belt 4, of which only its rear end, with the guide roller 5, is shown. The second conveyor is provided with regularly spaced pushers 6 for advancing individual ones of the objects 3, each object being spaced a determined distance from the next. An intermediate support 19 is mounted between the two conveyors 1 and 4.

Two levers 8 and 9 are mounted to pivot independently on a stationary pivot 7. A horizontal arm 10 is mounted free to swing on the lower end of the lever 8. The front end of the arm 10 is pivotally connected to a rod 11, which, at its other end, is pivotally connected to the lever 9.

The arm 10 carries a crosspiece 12, which is located above the objects 3 and crosswise to their direction of advance, and carries two buffers 29 that act as control means for each arriving object. The curved end of the crosspiece is built as a clamping jaw 13a for an object 3. The other end of the arm 10 has a second clamping jaw 13b, which pivots on a bolt 14 and is connected to a pivoting arm 15 carrying a roller 16 that acts as a cam follower. The roller, or cam follower, cooperates with a cam 17 (only very schematically shown), which so operates the jaw 13b that an object 3 is clamped between the jaws 13a and 14b, as will be more clearly explained.

Any suitable and known arrangement (not shown), such as cams, moves the two levers 8 and 9 independently, so that the crosspiece 12, the buffers 29, and the jaws 13a and 13b are moved along a closed curve. The closed curve described by the buffers 29 is indicated by the reference numeral 18 in FIG. 1.

Figure 2:
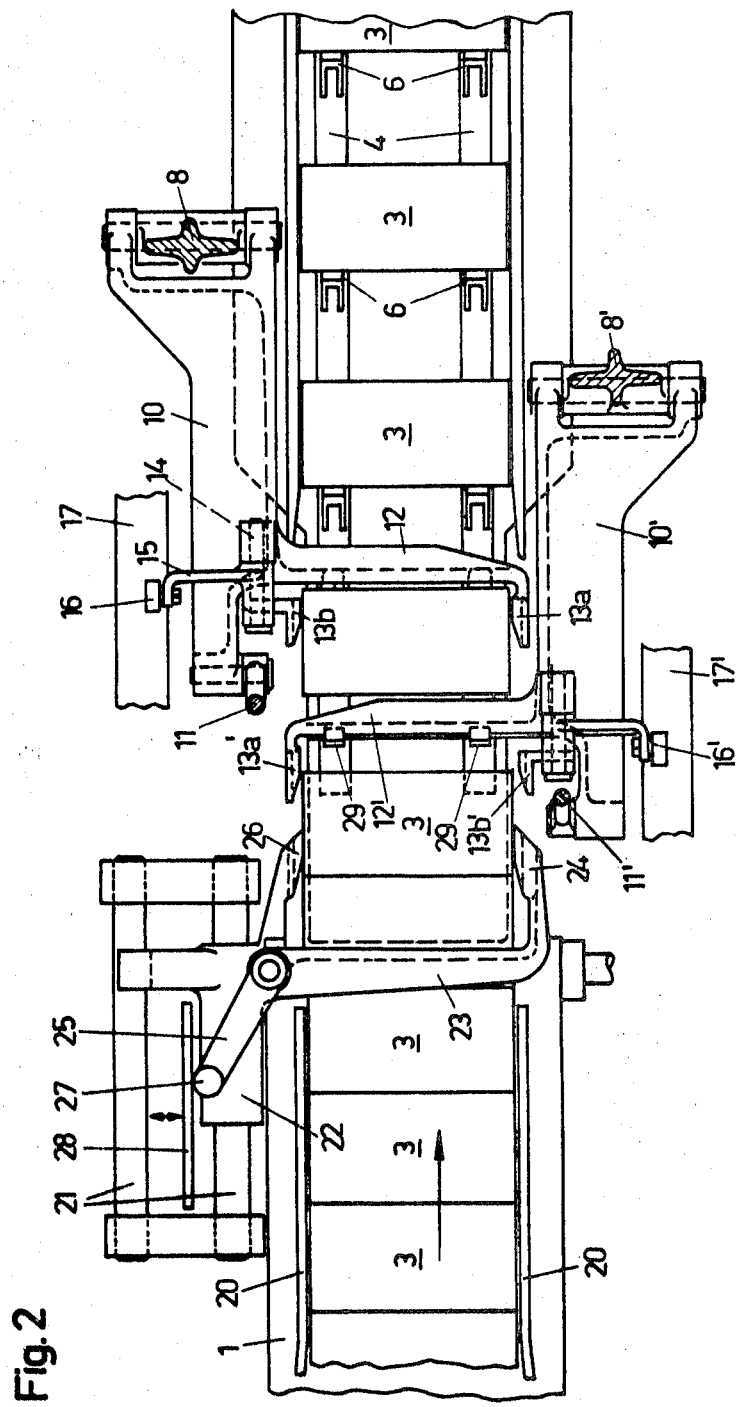
FIG. 2 is a top view taken along line 11–11 of FIG. 1.

The described clamping mechanism, comprising the levers 8 and 9, the arm 10, and the rod 11, is located, when viewed in the direction of object movement, on the left side of the conveyor 4. An exactly similar mechanism is also positioned, as shown in FIG. 2, on the right side of this conveyor. FIG. 2 shows the lever 8', the arm 10', and the rod 11'. The arm 10' carries the crosspiece 12' with the buffers 29' and the stationary and movable clamping jaws 13'a and 13'b.

The conveyor 1 incorporates two metal guides 20 for aligning the moving objects 3. Two guide rails 21 running parallel to the conveyor 1 are positioned alongside of the latter. A member 22, slidably mounted on these rails, carries a stationary arm 23 that incorporates a clamping jaw 24 and a pivotal lever 25 having a movable clamping jaw 26. The jaws 24 and 26 clamp the moving objects 3 as they are advanced by the conveyor belt 1. A cam 28 that cooperates with a cam follower 27, or roller, mounted on the end of the lever 25, operates the movable jaw 26.

The slidable member 22 is moved back and forth on the rails 21 by any suitable and known arrangement (not shown), such as a cam. At the same time that the member 22 moves to-and-fro the cam 28 moves up and down, so that the jaws 24 and 26 clamp the moving objects 3 in a manner to be described. A common drive synchronously operates the two crosspieces 12 and 12', the slidable member 22, the second conveyor 4, and the clamping jaws 13, 13', and 25.

The invention works in the following manner. The conveyor 1, moving at a uniform speed, carries a continuous row of contiguous objects 3 towards a second conveyor 4, which moves in steps, for example, in synchronism with some processing machine (not shown) to which it leads. The buffers 29, following the path 18, move downwards into the path of the foremost object 3 to cause the latter to move in step with the conveyor 4. In order that the buffers 29 can fulfill their purpose, the horizontal velocity of the conveyor 1 must be greater than that of the buffers 29, when the latter contact an object 3. Advantageously, the difference in velocities is made as small as possible. Once the buffers 29 make the object 3 move in step with the conveyor 4, this object is immediately clamped on its sides by the jaws 13a and 13b and is moved forward, at a velocity greater than that of the conveyor 1, to the position of the conveyor 4, before a pusher 6 moves into the way. A pusher 6 then moves into the space between the foremost object and the following object (this space appearing as a result of the difference in velocities of these two objects), and pushes the foremost object forward. While the clamping jaws 13a and 13b are advancing an object, the jaws 13a' and 13b' return in raised position to their starting position, form which they, in turn, clamp the next object and advance it to the conveyor 4 at a velocity greater than that of the conveyor 1.

In order to prevent any possibility that the following object is accidentally taken along when the foremost object is accelerated to the conveyor 4 (the two objects being stuck together, for example), the jaws 24 and 26 briefly clamp the following object. The sliding member 22, carrying the two jaws 24 and 26, moves in the advancing direction of the objects at the speed of the conveyor 1 and, after releasing an object, returns at high speed to its starting position, at which it clamps the next object in the same manner.

The two buffers 29, spaced along the length of the crosspiece 12, ensure that each object 3 is correctly oriented, crosswise to the conveyor 4, when it is clamped between the jaws 13. The same remark holds true, of course, for the buffers 29'.

The second endless conveyor 4 can be replaced by a to-and-fro pusher, which, during its nonworking return stroke, is pivoted in a known manner out of the working path. Reduced output when the stroke is long can be avoided by using two such pushers that operate alternately, as do the crosspieces 12 and 12'.

Although the preferred embodiment of the invention has been described, the scope of, and the breadth of protection afforded to, the invention are limited solely by the appended claims.

I claim:

1. A method of separating and uniformly spacing a row of articles supplied in contiguous relationship to the inlet end of a control station by a first advancing means moving continuously at a first speed, comprising the steps of causing the first article in said row to be seized by a clamping means moving at substantially the same speed as said first advancing means, increasing the speed of said clamping means to separate said first article from the succeeding article, causing said increase of the speed of said clamping means to be discontinued when said clamping means has achieved a second speed substantially equal to the speed of an adjacent second article advancing means disposed at the outlet end of said control station and moving at a higher speed than said first advancing means, releasing said first article from said clamping means, causing said first article to move with and at the same speed as said second advancing means, and repeating the same sequence of operations with succeeding articles in said row, whereby said articles are continuously advanced by said second advancing means in spaced interrelationship.

2. The method as set forth in claim 1, including the steps of causing the second article in said row to be seized and momentarily held by a second clamping means moving at substantially said first speed, and releasing said article from said second clamping means immediately following the separation of said first article from said second article.

3. In a conveyor comprising a first article advancing means movable continuously at a first speed, a second article advancing means positioned to receive articles from said first advancing means and movable continuously at a second speed that is greater than said first speed, an article clamping means mounted in the region of article transfer from said first advancing means to said second advancing means, support means for supporting said clamping means and moving it along a closed path in said transfer region at a speed which during a portion of said closed path increases substantially from said first to said second speed, and actuating means associated with said clamping means for closing and then opening said clamping means during its passage substantially through said portion of the closed path where the speed is increasing, whereby an article may be picked up from the discharge end of said first advancing means at said first speed, subjected to controlled acceleration, and deposited on said second advancing means at said second speed.

4. The device as set forth in claim 3, including a second article clamping means adjacent said first advancing means, support means supporting said second clamping means for sliding movement along said first advancing means substantially at said first speed, and actuating means for momentarily closing and then opening said second clamping means on the second article in said row to prevent said second article from being discharged together with said first article.

5. The device as set forth in claim 3, including a third article clamping means similar to said first clamping means and adapted to be operated alternately therewith.

6. The device as set forth in claim 3, in which said actuating means includes cooperating cams and cam followers.

7. The device as set forth in claim 3, including table means extending between said first and second advancing means for support of the articles during movement from said first to said second advancing means.